R. HAVEN.
Bee Hive.
No. 33,347.
Patented Sept. 24, 1861.
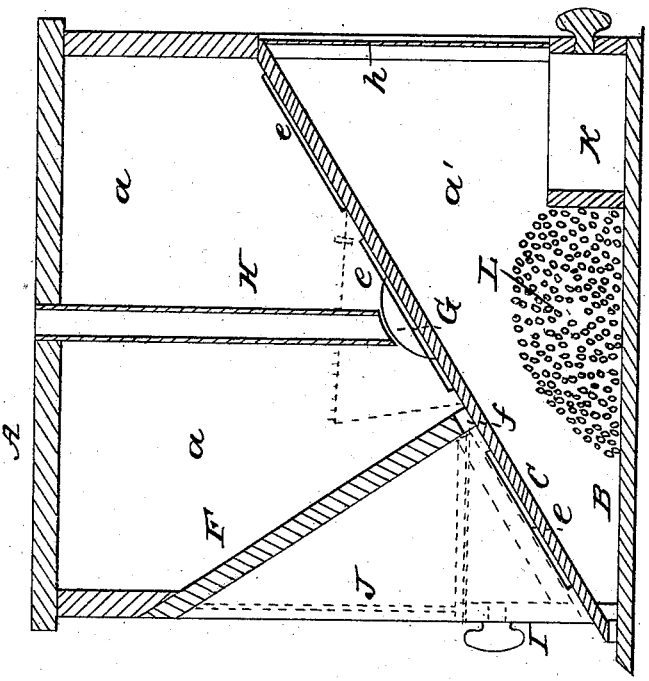
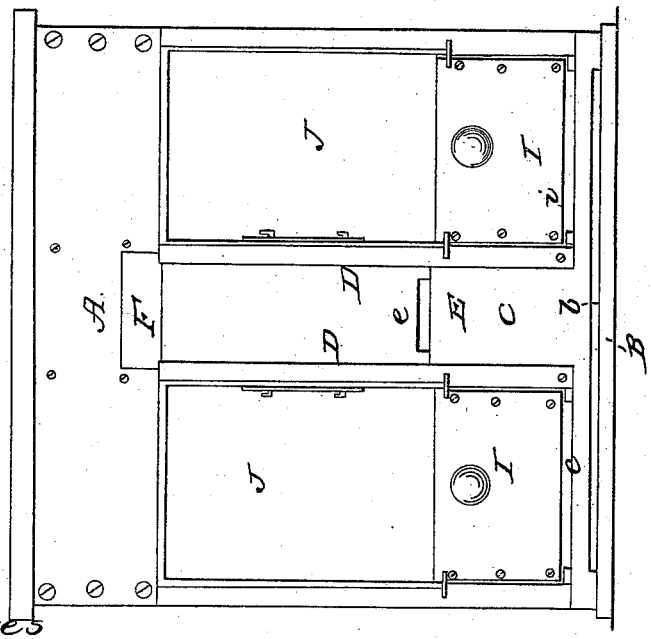
Witnesses
George H. M'Neill.
J. B. Woodruff.
Inventor
Rufus Haven.

UNITED STATES PATENT OFFICE.

RUFUS HAVEN, OF PERRYSVILLE, INDIANA.

IMPROVEMENT IN MOTH-TRAPS FOR BEE-HIVES.

Specification forming part of Letters Patent No. 33,347, dated September 24, 1861.

*To all whom it may concern:*

Be it known that I, RUFUS HAVEN, of Perrysville, in the county of Vermilion and State of Indiana, have invented new and useful Improvements in a Moth-Trap and Bee-Protector; and the following is a clear and exact description of the same, reference being had to the accompanying drawings, making a part of this specification, in which—

Figure 1 shows the front view with entrances for both bees and moths. Fig. 2 is a section through the center of a side elevation.

My invention consists in the construction of a box or trap having lighted compartments, (to be placed under any kind or form of bee hive or palace,) having numerous entrances thereto, so arranged as to decoy the moths below and around the bee-entrance to the hive, which is a tube placed perpendicularly, the lower end being directly over and coming near to a half-globe or cone-shaped elevation, so that the moths cannot fly into the tube, their tendency being to crawl with their heads down. They are decoyed by the bait placed in sponges or in the drawers in the compartments to receive them, where they are destroyed. The arrangement operates well for the destruction of ants, which in some places are a formidable enemy to bees.

To enable others skilled in the art to make and use my invention, I will describe it, referring to the drawings and the letters marked thereon.

I make a square box A, about the size of the hive to be placed over it, and divide it into three or more compartments $a\ a\ a'$ by putting above the horizontal bottom B another bottom or partition C, inclined to an angle of thirty or forty degrees, which comes so near the bottom as to leave a long narrow opening $b$ in front, of about one-eighth of an inch, which will admit the moth but not the bee. Above the inclined bottom C there are placed two upright partitions D D from front to rear, leaving a space E, from one to three inches wide, between them. Into the space E is fitted a sliding shutter F, it having a notch or opening $f$ in the lower end sufficiently large to admit the bee to pass in and out freely. The slide F, being inclined forward at the top, stands at about a right angle with the board C, thereby forming a deep recess into which the bee can fly before alighting to enter. On about the center of the inclined board C, and within the space E, is a projection G, in form of a half-sphere, on which the bees climb to aid them in entering the perpendicular metallic tube H, which is the only entrance to the hive. The nature of the bee is to hold up his head and to crawl up, while the moth is of the reverse. All along on the bottom edge of the partitions D D there are narrow openings $e\ e\ e$ into the compartments $a\ a$, which will not admit the bee, but will let the miller in, which is thinner and more flexible than the bee. In front, in the bottom of the compartments $a\ a$, are drawers I I, into which any fluid may be placed that will attract or decoy the moth. Under the drawers I I are also openings $i\ i$ for the moths to crawl in. Above each drawer is a pane of glass J J, to which the moth is attracted by the light, and falls in the liquid. The broad space under the inclined board C is fitted up in a similar manner as the front, having a larger drawer K and glass $k$.

A sponge L or any other cellular substance may be placed in the compartments, and the moths will deposit their eggs in them, and it has been demonstrated by experiment that the eggs so deposited will not mature, the porous and non-conducting nature of the material not affording sufficient warmth to produce incubation.

It is of the greatest importance in the spring to prevent the moths from entering into hives to deposit their eggs, which they will do more or less in all the various arrangements which have heretofore come to my knowledge, and in many places ants are very destructive to the healthy condition of the bees; and it will be readily seen that by my arrangement the entrance of both moth and ant is prevented, while the trap will most effectually decoy and destroy them.

Having thus fully described my invention and its operation and effect, what I claim as new, and desire to secure by Letters Patent, is—

The vertical tube H and the hemisphere G, in combination with the moth-compartments and the entrances thereto, arranged substantially in the manner and for the purposes as herein set forth.

RUFUS HAVEN.

Witnesses:
GEORGE H. MCNEILL,
J. B. WOODRUFF.